D. S. Morgan.
Mower.

Nº 179
31,183

Patented Jan. 22, 1861

UNITED STATES PATENT OFFICE.

DAYTON S. MORGAN, OF BROCKPORT, NEW YORK.

IMPROVEMENT IN HARVESTERS.

Specification forming part of Letters Patent No. 31,183, dated January 22, 1861.

*To all whom it may concern:*

Be it known that I, DAYTON S. MORGAN, of Brockport, in the county of Monroe and State of New York, have invented a new and useful Improvement in Harvesters, of which the following is a full, clear, and exact description, reference being had to the accompanying drawings, which make a part of this specification, in which—

Figure 2:
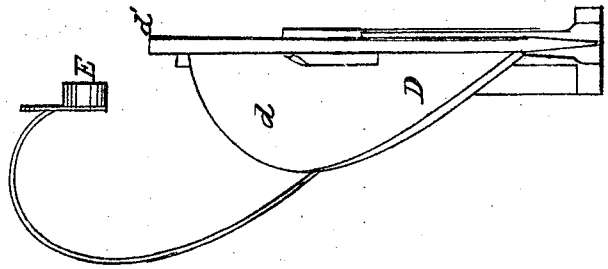
Figure 1:
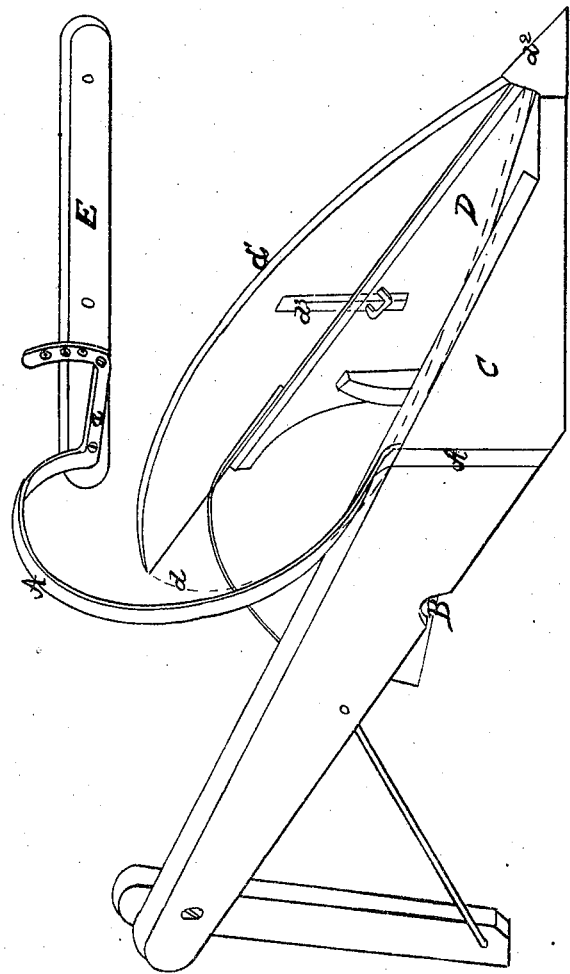

Figure 1 represents a view in perspective of that side of a harvesting-machine which runs next the standing grain, with my improvement applied thereto, as the same would appear to a spectator stationed on the grain side of the machine, and in front thereof, the red lines showing the additional dividing-board employed in reaping; and Fig. 2 represents a view of the same as seen by a spectator directly in front of the divider.

My improvement is more especially adapted to the machine patented by William H. Seymour in the year 1852, and known as the "New York Reaper."

In the operation of a harvesting-machine the divider enters the standing crop in advance of the cutting apparatus, but at one side thereof, and separates the stalks to be severed from those to be left standing until a succeeding tour of the machine around the field. As the point of the divider enters the crop near the surface of the ground, the lower ends of the stalks are effectually separated; but in cutting tall, heavy, and tangled grain it is found that the heads of the grain still remain entangled, notwithstanding the separation of the butts. In consequence of this fact, when the stalks contiguous to the inner side of the divider are severed by the cutting apparatus, they are dragged over the divider, as the machine advances, and lie across it. If the heads still remain entangled, a portion of the cut grain would adhere to that which was left standing, and would be liable either to be scattered and lost or be swept around by the reel and clog it.

The simplest form of a reel-support, and consequently the one most likely to suggest itself to the mind of an inventor, is an upright post on the grain side of the machine; and it is accordingly found upon some of the earliest machines used in this country. On trial, however, the post thus situated was found to catch the stalks, and thus to obstruct the working of the reel, and was consequently abandoned. To remedy this defect, McCormick, in his patent of 1845, curved his reel-post near the bottom, in order to leave a space in which the ends of the reel-ribs might revolve, and thus assist in separating the grain. This plan was, however, found in practice to be as defective as the other, for, the reel-post being still within the outer diverging lines of the divider, the grain caught upon the post as much as before, notwithstanding its curvature, and obstructed the reel. This device was therefore likewise abandoned. It was then perceived that the great desideratum in this part of the machine was to have an unobstructed space between and around the reel, reel-post, and divider, in which space the ends of the reel-ribs might revolve to assist in the separation of the cut from the uncut grain. To effect this purpose a horizontal reel-bearer supported at its rear end only, and extending over the divider above the entering grain, has been employed in combination with a straight reel-post. This device, however, although it answers a very good purpose in mowing or in reaping short grain, is yet found to be defective in cutting tall and heavy grain, because its stalks are apt to become entangled in the angle formed by the junction of the reel-bearer and its support, and thus to interfere with the proper working of the reel. This is especially the case when the point of the support of the reel-bearer is placed near the front of the machine, in which the grain end of the reel is supported by two inclined arms united at one end, so as to resemble the letter V, placed upon the machine within the diverging lines of the divider, with the open end of the V foremost, and its upper leg in a horizontal position, or nearly so, this plan being open to the objection both of the catching of the stalks on the post and of their clogging in the angle as above described.

It is the object of my invention to provide a means for supporting the grain end of the reel-shaft, which shall combine the advantages of the reel-bearers heretofore employed, while avoiding the defects incident to their former mode of construction; and to this end my invention consists in the employment of a peculiarly-shaped reel-support fastened to the inner or grain side of the machine, and in front of its axis of oscillation, said post being curved outwardly beyond the outer diverging line of the divider, in order to leave an open space above the divider, and then curved inwardly again above the level of the reel-bearer sufficiently to bring the end to which the reel-bearer is attached above but somewhat outside of the rising line of the divider, whereby I am enabled to remove or replace the divider at pleasure, to employ a shorter and lighter reel-bearer to assist in balancing the machine, and finally to leave an open and unobstructed space between and around the reel, reel-post, and divider, through which space grain may be swept in the process of separation without any danger either of catching upon the post or of clogging the reel.

In the accompanying drawings my improvement is represented as applied to the harvesting-machine known as the "New York Reaper." In this instance the lower end of the reel-support A is firmly secured to the outer longitudinal beam, C, of the frame in front of the bearing B of the grain-wheel. The reel-support is gradually curved outward from its point of attachment to the beam C, so as to pass outside of the diverging line of the divider to a point somewhat above the level of the vertical line $d'$ of the supplementary divider D. From this point the reel-support is curved over in the form of an arch, the crown of which is somewhat above the level of the reel-bearer, until that end to which the bearer E is attached is above and just outside of the rising line of the divider, in order that the reel-ribs may overlap said rising line.

The reel-bearer E may be secured to the support A by means of a screw passing through holes in the bent arm $a$. The height of the forward end of the bearer may readily be adjusted by means of a series of holes in the bent arm, as shown in the drawings, or by means of a slot and set-screw.

In the "New York reaper," above referred to, the frame oscillates on its wheels, like a cart; or, in other words, its axis of oscillation is parallel to the finger-beam and at right angles to the line of draft, while the raker's position is upon the extreme rear edge of the platform. By using a reel-support located as and of the form herein described, I am enabled to use a light and short reel-bearer, and to make both its weight and that of its support assist in counterbalancing the weight of the raker. A reel-bearer as long as that shown in the drawings is rarely, if ever, required in practice.

Besides the divider used in mowing, it is customary, when reaping, to employ an additional one, in order more effectually to separate the tall and heavy grain. This supplementary divider D is shown in red lines in Fig. 1 of the drawings and in black lines in Fig. 2. It consists of a flat board, $d$, straight on its inner edge, but swelling gradually on its outer side as it extends backward until it reaches the reel-support, whence it abruptly curves inwardly again, having a vertical board, $d'$, shaped like the segment of a circle of large radius, secured to the inner edge, the two boards being set at right angles to each other.

To place the supplementary divider in position it is only necessary to insert its point into the socket $d^2$ on the extremity of the under divider, and its pin $d^3$ into the staple or socket near its middle. It will readily be perceived that the operation of removing or replacing the divider is very much facilitated by the peculiar shape given to the reel-support. As the machine advances through the field, the divider separates the grain to be cut from that to be left standing. The greater portion of the grain falls, as it is cut, upon the platform; but if the heads are at all entangled, some of the stalks still adhere to the standing grain, and are consequently dragged across the divider, when they are either separated by the action of the reel or else drawn away from the machine and left hanging to the standing grain. That portion of the grain thus dragged across the divider was, in the devices heretofore used, very apt either to be caught upon the reel-post or in the angle formed by the junction of the reel-post and the bearer; but in my machine, owing to my peculiar configuration of the reel-post, an ample unobstructed space is left, through which the grain is swept without impediment. This fact I have fully demonstrated by experiment.

I am aware that curved reel-supports, horizontal reel-bearers, and supplementary dividers have all been used previously to the date of my application, and do not, therefore, broadly claim any such devices *per se;* but

What I claim as my invention, and desire to secure by Letters Patent, is—

The combination of the peculiarly-curved reel-support A with the horizontal arm E and supplementary divider D, when the whole are arranged relatively to each other and to the frame of the machine, substantially as herein described, and for the purpose set forth.

In testimony of which invention I hereunto set my hand.

D. S. MORGAN.

Witnesses:
C. MERIAM,
JOHN H. HUBBARD.